(No Model.)
F. F. IDE.
Apparatus for Adjusting Balance Wheels of Watches.
No. 230,781. Patented Aug. 3, 1880.
Fig. 1.
Fig. 2.
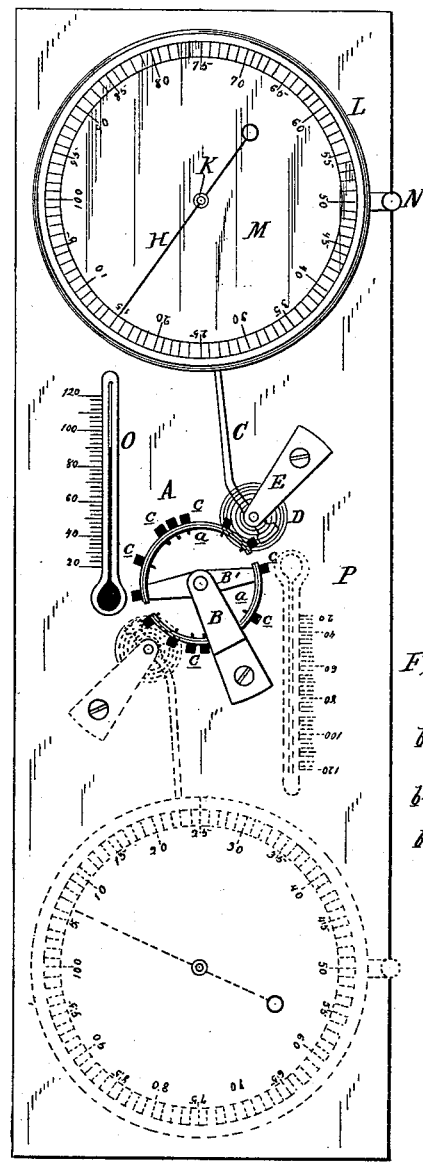
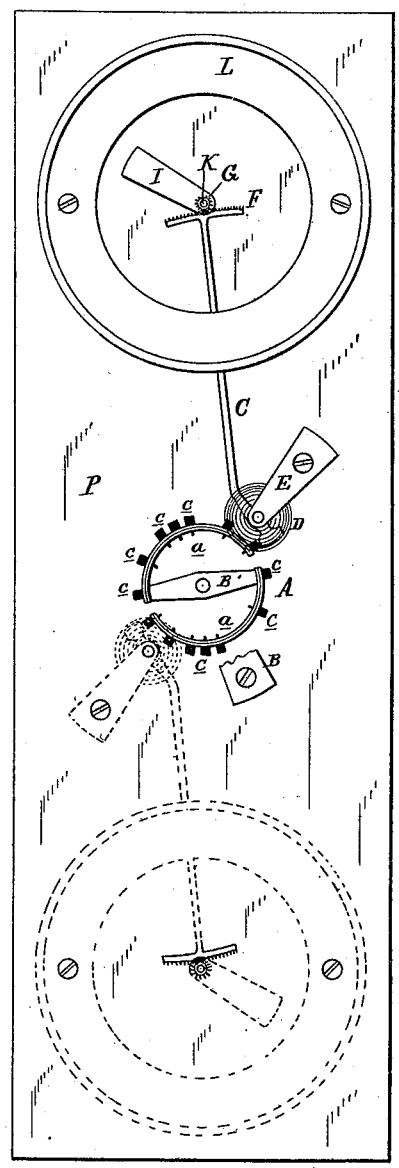
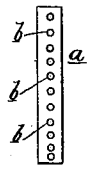
Fig. 3.
WITNESSES:
Henry N. Miller
C. Sedgwick
INVENTOR:
F. F. Ide
BY Munn & Co.
ATTORNEYS.
N. PETERS, PHOTO-LITHOGRAPHER, WASHINGTON, D. C.

UNITED STATES PATENT OFFICE.

FERDINAND F. IDE, OF SPRINGFIELD, ILLINOIS.

APPARATUS FOR ADJUSTING BALANCE-WHEELS OF WATCHES.

SPECIFICATION forming part of Letters Patent No. 230,781, dated August 3, 1880.

Application filed March 18, 1880. (No model.)

*To all whom it may concern:*

Be it known that I, FERDINAND F. IDE, of the city of Springfield, in the county of Sangamon and State of Illinois, have invented a new and Improved Method and Apparatus for Adjusting and Regulating Balance-Wheels of Chronometers, &c., of which the following is a specification.

Figure 1 is a front elevation of the device. Fig. 2 is a front elevation of the same with some parts removed, the better to exhibit others. Fig. 3 is an elevation of the edge or periphery of a balance-wheel.

Similar letters of reference indicate corresponding parts.

The object of this invention is to adjust and regulate balance-wheels that are to be used in chronometers or like instruments more easily, quickly, and accurately than is now done by other methods.

The invention consists in the measurement, by mechanical or other means, at or in different degrees of temperature, of any change or changes in form, shape, or size of the balance-wheel, caused by the contraction and expansion of the metal or metals of which the said wheel is composed or constructed, from which measurement the proper position on the balance-wheel of each screw or weight to be placed thereon can be easily and quickly known or ascertained, and the balance-wheel at once, with but little further time or trouble, be adjusted or regulated, so that its action in the chronometer, &c., will be the same at different degrees of temperature.

In the drawings, A represents the balance-wheel, having two semicircular arms, *a a*, each arm composed of two concentric strips of metal of different contractibility and expansibility; and through the periphery of each arm are bored a series of holes, *b b*, into some of which pegs or screws *c c*, serving as weights, are inserted in the ordinary method of adjustment.

B is a bridge to hold the balance-wheel A firmly in position, and B' is the arm co-operating for the same purpose. C is the lever of the indicator. D is the coiled spring to keep the short arm of the lever C in contact with the balance-wheel A. E is the bridge to hold the lever C and spring D in position. F is a rack or section of a wheel secured to the lever C. G is a pinion to move the pointer H, and I is the bridge to hold the pivot K of the pinion G and pointer H in position. L is the dial-frame. M is the dial, graduated and numbered in the usual manner. N is the handle to turn the dial, so as to place the point of 100° under the pointer H at the lowest or highest temperature. O is a thermometer. P is the plate to which the parts are connected.

The apparatus herein described has but one dial and its necessary attachments; but two dials, and preferably, can be used at the same time, as shown in dotted lines in the drawings.

In the adjustment of balance-wheels of chronometers the first and most important thing to know is whether each wing or arm of the balance-wheel is affected the same by heat and cold. If the contraction and expansion of the arms at like degrees of temperature are not equal the balance-wheel is not suitable to be put in a chronometer intended to indicate correct time.

Balance-wheels can be and are now adjusted to heat and cold by being run and tested at different degrees of temperature, and the screws or weights changed from point to point in the rim by guess until the action is the same, or approximately so, at all temperatures. This being done while the chronometer is running in one place or position, and not when carried or moved about during such test or trial, one arm or wing of the balance-wheel may be affected by heat or cold more than the other. Consequently one may have too much action and the other may have too little, the excessive contraction or expansion of the one counteracting or balancing the other, the average being such that the chronometer, while running in one position or place, may indicate time correctly; but a chronometer with such a balance-wheel, subjected to motion or jarring by being carried while riding or walking, will fail to indicate time correctly, the action of the balance being different or irregular on account of its being out of poise, one side being heavier than the other, one wing or arm being farther away from the center of motion than the other, on account of unequal expansion and contraction; but chronometers with balance-wheels adjusted by my method, being in poise at all temperatures, will run the same in heat and cold in one position or place or when carried about.

A balance-wheel, A, each arm or wing of which expands or contracts equally or alike at different degrees of temperature, being selected, and adjustment to heat and cold effected by the present prevailing method, as described, or any other way, is then placed in machine or apparatus upon the plate P, as shown, with its screws or weights *c c* in position, the dial M being then set so that the pointer H indicates 100°, the plate P with its attachments is exposed to different degrees of heat and cold, which will be indicated by thermometer O. Then the change in form, size, or shape, or the degree and amount of contraction and expansion of the said balance-wheel, which is in contact with the short arm of the lever C, and thereby operates to move the pointer H, whose movements indicate such change in form and shape, is carefully observed and noted, as indicated at each degree of temperature at which it is exposed, and the positions of the regulating-weights are also carefully noted. Then any other balance-wheel of same proportions, same weight, and with same weight and length of hair-spring, and having same change in form and size at the different temperatures, respectively, as indicated by being placed in machine can and will be adjusted by placing like regulating-weights in the same relative positions in or upon such balance-wheel.

Having thus described my invention, I claim as new and desire to secure by Letters Patent—

1. The method, substantially as herein shown and described, of adjusting or regulating balance-wheels of chronometers and like instruments or machines, which method consists in placing the balance-wheel in a machine or apparatus constructed for the purpose, substantially as herein set forth, so that the degrees or amount of contraction and expansion of said balance-wheel at different degrees of temperature can be known.

2. An apparatus for adjusting or regulating balance-wheels of chronometers and the like, constructed substantially as and for the purpose herein shown and described, consisting of plate P, lever C, provided with rack F, spring D, pinion G, pointer H, dial and dial-frame M L, and thermometer O, as set forth.

FERD. F. IDE.

Witnesses:
GEORGE CARPENTER,
WILLIAM C. WOOD.